US011007654B2

(12) United States Patent
Patil

(10) Patent No.: US 11,007,654 B2
(45) Date of Patent: May 18, 2021

(54) END MANIPULATOR FOR PACKAGE PICKING AND PLACING

(71) Applicant: INTELLIGRATED HEADQUARTERS, LLC, Mason, OH (US)

(72) Inventor: Madhav Patil, Saint Louis, MO (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 16/448,171

(22) Filed: Jun. 21, 2019

(65) Prior Publication Data

US 2020/0398440 A1 Dec. 24, 2020

(51) Int. Cl.

| B25J 15/06 | (2006.01) |
|---|---|
| B25J 19/02 | (2006.01) |
| B25J 18/02 | (2006.01) |
| B65G 47/91 | (2006.01) |
| B25J 9/14 | (2006.01) |

(52) U.S. Cl.
CPC ........... *B25J 15/0616* (2013.01); *B25J 9/144* (2013.01); *B25J 18/025* (2013.01); *B25J 19/022* (2013.01); *B65G 47/91* (2013.01); *B65G 2249/045* (2013.01)

(58) Field of Classification Search
CPC ...... B25J 15/0616; B25J 9/144; B25J 18/025; B25J 19/022; B65G 47/91; B65G 2249/045
See application file for complete search history.

(56) References Cited

U.S. PATENT DOCUMENTS

| 5,609,377 A  * |  3/1997 | Tanaka  ................. | B65G 47/918 |
|---|---|---|---|
| | | | 294/65 |
| 6,015,174 A  * |  1/2000 | Raes  .................... | B25J 15/0253 |
| | | | 294/119.1 |
| 8,651,543 B2 * |  2/2014 | Matsuoka  ........... | B25J 15/0023 |
| | | | 294/192 |
| 9,725,257 B2 * |  8/2017 | Schenning  ............ | B65G 67/24 |
| 10,478,966 B2 * | 11/2019 | Sekiguchi  ............. | B25J 9/0096 |

(Continued)

FOREIGN PATENT DOCUMENTS

DE       102011115951 A1    4/2013

OTHER PUBLICATIONS

Extended European Search Report issued in EP Application No. 20180634.6 dated Nov. 13, 2020, 8 pages.

*Primary Examiner* — Ronald P Jarrett
(74) *Attorney, Agent, or Firm* — Alston & Bird LLP

(57) ABSTRACT

An end manipulator for picking packages is provided. An example end manipulator includes a vacuum plate coupled to a machine where the vacuum plate includes a first set of vacuum cups. Further, the end manipulator includes a grasper plate movably coupled to the machine. The grasper plate moves between a retracted position and an extended position. In the retracted position, the grasper plate aligns with the vacuum plate such that the grasper plate abuts the vacuum plate. In the extended position, the grasper plate extends out from the vacuum plate. In some examples, when the grasper plate is in the retracted position, the end manipulator is configured to pick and place a first type of package. Further, in some examples, when the grasper plate is in extended position, the end manipulator is configured to pick and place a second type of package.

20 Claims, 9 Drawing Sheets

(56) References Cited

U.S. PATENT DOCUMENTS

| | | | | |
|---|---|---|---|---|
| 10,611,580 B1* | 4/2020 | Polido | ............... | B65G 47/912 |
| 2006/0242785 A1* | 11/2006 | Cawley | ............... | B65G 47/91 |
| | | | | 15/321 |
| 2009/0142169 A1* | 6/2009 | Garcia | ............... | B25J 15/0052 |
| | | | | 414/222.02 |
| 2010/0230984 A1* | 9/2010 | Maffeis | ............... | B25J 15/0616 |
| | | | | 267/136 |
| 2016/0075035 A1* | 3/2016 | Sun | ............... | B25J 15/0616 |
| | | | | 294/188 |
| 2016/0257503 A1 | 9/2016 | Komuro | | |
| 2017/0107058 A1 | 4/2017 | Nakamoto et al. | | |
| 2019/0228371 A1* | 7/2019 | Murphy | ............... | G05B 19/402 |
| 2019/0344447 A1* | 11/2019 | Wicks | ............... | B25J 15/0691 |

* cited by examiner

END MANIPULATOR FOR PACKAGE PICKING AND PLACING

TECHNOLOGICAL FIELD

Embodiments of the present disclosure relate generally to a material handling environment and, more particularly, to an end manipulator of a machine for picking and placing packages in the material handling environment.

BACKGROUND

Material handling environments, such as warehouses, retail outlets, and/or shipping locations, may include storage compartments or racks that may be utilized to store packages. Storing and retrieving the packages from these compartments or racks may be facilitated by one or more machines. Examples of such machines may include robotic arms, conveyors, singulator systems, sorters, and/or the like.

BRIEF SUMMARY

Various embodiments illustrated herein disclose an end manipulator for a machine. The end manipulator includes a vacuum plate configured to be coupled to the machine, and the vacuum plate includes a first set of vacuum cups. Further, the end manipulator includes a grasper plate configured to be movably coupled to the machine. The grasper plate is configured to move between a retracted position and an extended position. In the retracted position, the grasper plate aligns with the vacuum plate such that the grasper plate abuts the vacuum plate. In the extended position, the grasper plate extends out from the vacuum plate. In some examples, when the grasper plate is in the retracted position, the end manipulator is configured to pick and place a first type of package. Further, in some examples, when the grasper plate is in extended position, the end manipulator is configured to pick and place a second type of package.

Various embodiments illustrated herein disclose a machine that includes a first actuation unit. Further, the machine includes a shelf coupled to the first actuation unit. The first actuation unit is configured to facilitate movement of the shelf along a first axis of the machine. Furthermore, the machine includes a second actuation unit coupled to the shelf. Additionally, the machine includes an end manipulator coupled to the second actuation unit. The second actuation unit is configured to facilitate movement of end manipulator along another axis perpendicular to the first axis. The end manipulator includes a base plate coupled to the second actuation unit. Further, the end manipulator includes a vacuum plate coupled to the base plate. The vacuum plate includes a first set of vacuum cups. Furthermore, the end manipulator includes a grasper plate movably coupled to base plate. The grasper plate is configured to move between a retracted position and an extended position. In the retracted position, the grasper plate aligns with the vacuum plate such that the grasper plate abuts the vacuum plate. In the extended position, the grasper plate extends out from the vacuum plate. When the grasper plate is in the retracted position, the end manipulator is configured to pick and place a first type of package. Further, when the grasper plate is in extended position, the end manipulator is configured to pick and place a second type of package.

Various embodiments illustrated herein disclose a method for operating a machine. The method includes determining a type of a package to be picked by the machine, wherein the type of the package is at least one of a first type of package or a second type of package. In response to determining that the type of package is the first type of package, causing a grasper plate in an end manipulator of the machine to move to a retracted position. In the retracted position, the grasper plate aligns and abuts with a vacuum plate in the end manipulator. Further, in the retracted position, the method includes actuating a first set vacuum cups and a second set of vacuum cups of the vacuum plate and grasper plate, respectively, to pick the package. In response to determining that the type of package is the second type of package, the method includes causing the grasper plate in the end manipulator of the machine to move to an extended position. In the extended position, the grasper plate extends out from the vacuum plate to hold the second type of package between the grasper plate and the vacuum plate.

BRIEF DESCRIPTION OF THE DRAWINGS

The description of the embodiments may be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
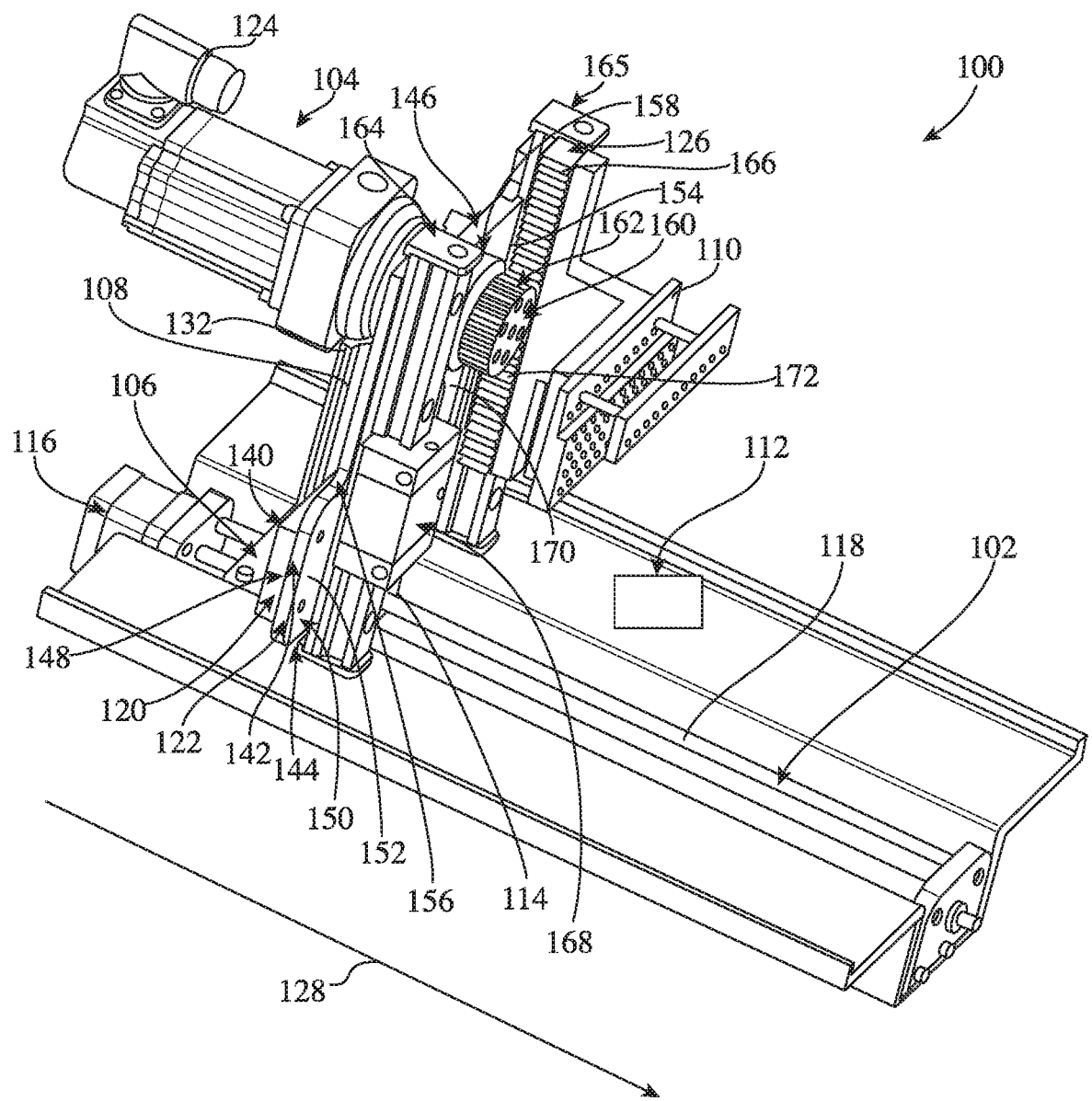
FIG. 1 illustrates a perspective view of a machine, in accordance with one or more embodiments.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "comprising" means including but not limited to and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," and the like generally mean that the particular feature, structure, or characteristic following the phrase may be included in at least one embodiment of the present disclosure or may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "package" as used herein may correspond to a physical item, parcel, object, element, device, or the like. For example, a warehouse or a retail outlet (e.g., a scene) may be configured to store packages, such as parcels, envelopes, cartons, shipping containers, totes, and/or the like for transit. In some examples, the package may correspond to a two-dimensional (2D) package and/or a three-dimensional (3D) package. In an example embodiment, the 3D package may correspond to a package that has three dimensions (e.g., height, width, and length). In an example embodiment, the 3D package may correspond to a 3D package where one of the dimensions (e.g., height) is negligible. Some examples of the 3D package may include, but are not limited to, a piece of paper, an envelope, etc.

The term "first type of package" as used herein may correspond to a package that has a smooth surface. Some examples of the first type of packages may include, but not limited to, cartons, boxes, plastic bags, and/or the like.

The term "second type of package" as used herein may correspond to a package that has an irregular surface. In some examples, the irregular surface may define features on the package such as flanges, grooves, protrusions, and/or the like. Some examples of the second type of packages may include, but not limited to, totes, containers, and/or the like.

In material handling environments, such as warehouses and retail outlets, machines having end manipulators are used to pick and place packages. Examples of the end manipulators may include a vacuum based end manipulator or a clamp-based end manipulator. In some examples, the vacuum-based end manipulator may be configured to pick a first package of a first type of package, while the clamp-based end manipulator may be configured to pick a second package of a second type of package. In an example embodiment, the first type of package may include packages that have substantially smooth surface(s). Some examples of the first type of packages may include, but not be limited to, cartons, boxes, plastic bags, and/or the like. In an example embodiment, the second type of package may include packages that may have irregular surface(s). For example, the irregular surface of the second package may define features such as, but not limited to, flanges, grooves, protrusions, and/or the like. In some examples, the clamp-based manipulator on the machine may utilize the features to pick the second package.

Traditionally, based on the type of package (either the first type of package or the second type of package) that is to be picked and placed, the operator of the machine may attach the appropriate end manipulator. For example, to enable the machine to pick the first package of the first type of package, the operator may attach a vacuum-based end manipulator to the machine. Similarly, to enable the machine to pick the second package of the second type of package, the operator may replace the vacuum-based end manipulator with a clamp-based end manipulator. Such replacement of end manipulators may cause a loss in productivity.

Apparatuses, systems, and methods described herein disclose an end manipulator that enables a machine to pick any type of the package (e.g., the first type of package or the second type of package) without the need to replace the end manipulator. The end manipulator may include a base plate that is coupled to the machine. Further, the end manipulator may include a vacuum plate that may be coupled to the base plate. The vacuum plate may have a first set of vacuum cups mounted on a first top surface of the vacuum plate. In an example embodiment, the first set of vacuum cups is coupled to a vacuum generator on the machine. The vacuum generator may be configured to generate vacuum in the first set of vacuum cups to enable the end manipulator to grasp/pick the first package of first type of package through at least the first set of vacuum cups.

The end manipulator further includes a grasper plate that is movably coupled to the base plate. The grasper plate is configured to move between a retracted position and an extended position. In some examples, the grasper plate is coupled to the base plate through a biasing member such as, but not limited to, a spring. In an example embodiment, the biasing member keeps the grasper plate in the retracted position when no external force is applied on the grasper plate (e.g., urges the grasper plate to the retracted position). In the retracted position, the grasper plate aligns with the vacuum plate in such a manner that a first top surface of the vacuum plate and a second top surface of the grasper plate lie in the same plane. In some examples, further in the retracted position, the grasper plate may abut the vacuum plate such that the second top surface of the grasper plate and the first top surface of the vacuum plate together form a contiguous top surface of the end manipulator. Further, the grasper plate has a second set of vacuum cups mounted on the second top surface of the grasper plate. The second set of vacuum cups may also be coupled to the vacuum generator on the machine.

In the retracted position, the end manipulator is configured to grasp and/or pick the first package of the first type of package using the first set of vacuum cups (positioned on the vacuum plate) and the second set of vacuum cups (positioned on the grasper plate).

In an example embodiment, the grasper plate may be further coupled with an actuation unit that is configured to apply force on the grasper plate causing the grasper plate to move to the extended position. In the extended position, the grasper plate is configured to extend out from the vacuum plate. Further, in the extended position, the end manipulator is configured to grasp/pick the second package of the second type of package by holding the second package between the grasper plate and the vacuum plate. Accordingly, the end manipulator, in accordance with the one or more embodiments, may enable the machine to pick the first type of package and the second type of package without need to change the end manipulator for each type of package (i.e., the first type of package and the second type of package).

Figure 2:
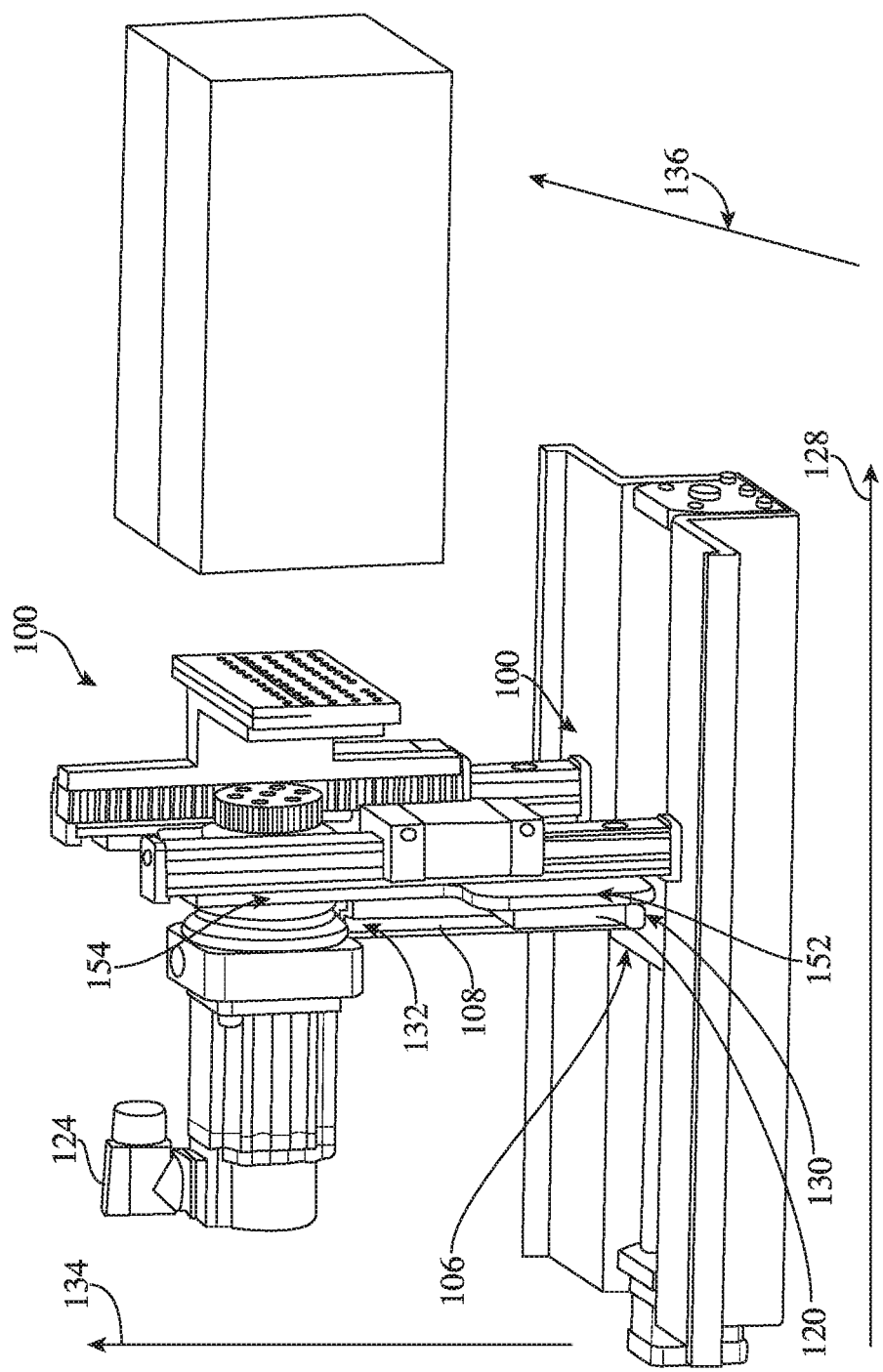
FIG. 2 illustrates a side view of the machine, in accordance with one or more embodiments.

FIG. 1 and FIG. 2 illustrate a perspective view and a side view, respectively, of a machine 100, in accordance with one or more embodiments. In an example embodiment, the machine 100 includes a first actuation unit 102, a second actuation unit 104, a shelf 106, a vertical support member 108, an end manipulator 110, and a control system 112. In some examples, the first actuation unit 102 includes one or more traction members 114, a first motor 116, and one or more first tracks 118. Further, in some examples, the second actuation unit 104 includes a first base plate 120, a track frame 122, a second motor 124, and a gear rack assembly 126.

Referring to the first actuation unit 102, the one or more first tracks 118 may be positioned along a first axis 128. In an example embodiment, the one or more first tracks 118 define a first traversal path along the first axis 128. In some examples, the one or more traction members 114 are movably engaged with the one or more first tracks 118. Examples of the one or more traction members 114 may include, but are not limited to, wheels, belts, and ribbon. Further, the first motor 116 is coupled with the one or more traction members 114. In an example embodiment, the first motor 116 may be configured to drive the one or more traction members 114 causing the one or more traction members 114 to move on the one or more first tracks 118 along the first axis 128.

In some examples, the shelf 106 is coupled to the one or more traction members 114 such that when the first motor 116 drives the one or more traction members 114, the shelf 106 also moves along the first axis 128. In some examples, the vertical support member 108 may be fixedly mounted on the shelf 106. The vertical support member 108 has a first end 130 (See FIG. 2) and a second end 132 along a longitudinal axis 134 (See FIG. 2) of the vertical support member 108. In an example embodiment, the first end 130 of the vertical support member 108 is fixedly coupled to the shelf 106 such that the longitudinal axis 134 of the vertical support member 108 is orthogonal to the first axis 128. Further, the second end 132 of the vertical support member 108 is fixedly coupled to the second motor 124.

In an example embodiment, the vertical support member 108 is further coupled to the first base plate 120 in a direction of the first axis 128 and proximal to the first end 130 of the vertical support member 108. In some examples, the first base plate 120 is coupled to the vertical support member 108 in such a manner that a longitudinal axis 136 (See FIG. 2) of the first base plate 120 is perpendicular to the longitudinal axis 134 of the vertical support member 108 and the first axis 128. In some examples, a periphery of the first base plate 120 extends out from a periphery of the shelf 106. Further, the first base plate 120 defines a first surface 140 and a second surface 142. In an example embodiment, the first surface 140 of the first base plate 120 abuts the vertical support member 108 and the second surface 142 of the first base plate 120 abuts the track frame 122. In some examples, the track frame 122 is fixedly coupled to the first base plate 120.

In an example embodiment, the track frame 122 defines a first end 144, a second end 146, a first surface 148, and a second surface 150. The first end 144 of the track frame 122 and the second end 146 of the track frame 122 are defined along the longitudinal axis 134 of the vertical support member 108. In some examples, the first end 144 of the track frame 122 may be proximal to the shelf 106 and the second end 146 of the track frame 122 may be distal from the shelf 106. Further, in some examples, the track frame 122 includes a wing portion 152 and a body portion 154. In some examples, the wing portion 152 of the track frame 122 extends from the first end 144 of the track frame 122 to a junction 156 between the wing portion 152 and the body portion 154. Further, the body portion 154 extends between the second end 146 of the track frame 122 and the junction 156 between the wing portion 152 and the body portion 154. In some examples, a length of the wing portion 152 along the longitudinal axis 136 of the first base plate 120 is greater than the length of the body portion 154 along the longitudinal axis 136 of the first base plate 120. Further in some examples, the length of the wing portion 152 of the track frame 122 may be equal to the length of the first base plate 120 along the longitudinal axis 136 of the first base plate 120. In an example embodiment, the wing portion 152 of the track frame 122 is coupled to the first base plate 120 through one or more means such as, but not limited to, nut and bolt, welding, and/or the like, such that a portion of the first surface 148 of the track frame 122 (i.e., the first surface 148 included within the wing portion 152 of the track frame 122) abuts the second surface 142 of the first base plate 120.

In an example embodiment, the second surface 150 of the track frame 122 may define a through-hole 158 in the body portion 154 of the track frame 122. The through-hole 158 extends from the second surface 150 of the track frame 122 to the first surface 148 of the track frame 122 to the first surface 148 of the track frame 122. Further, in some examples, the through-hole 158 is positioned proximal to the second end 146 of the track frame 122. In an example embodiment, the through-hole 158 is configured to receive a rotor shaft (not shown) of the second motor 124. The rotor shaft (not shown) of the second motor 124 is configured to receive a sprocket 160 having a plurality of first teeth 162.

Referring back to the track frame 122, in some examples, the track frame 122 further includes a second track 164 and a third track 165. The second track 164 and the third track 165 extend from the first end 144 of the track frame 122 to the second end 146 of the track frame 122 along the longitudinal axis 134 of the vertical support member 108. Further, the second track 164 and the third track 165 may be defined in such a manner that the second track 164 is spaced apart from the third track 165 along the longitudinal axis 136 of the first base plate 120. Furthermore, the second track 164 and the third track 165 may be defined at the periphery of the body portion 154 of the track frame 122. In some examples, the second track 164 and the third track 165 are configured to provide a second traversal path for a component of the machine 100 to traverse along the longitudinal axis 134 of the vertical support member 108. For example, the second track 164 and the third track 165 may provide the second traversal path for the gear rack assembly 126 to traverse along the longitudinal axis 134 of the vertical support member 108.

In an example embodiment, the gear rack assembly 126 is movably mounted on the second track 164 and the third track 165. The gear rack assembly 126 comprises a gear rack 166, a counter weight 168, and gear rack frame 170. In some examples, the gear rack 166 may be movably mounted on the third track 165. In an example embodiment, the gear rack 166 is slidable on the third track 165. Further, the gear rack 166 includes a plurality of second teeth 172 that are configured to be coupled with the plurality of first teeth 162 on the sprocket 160. Accordingly, when the second motor 124 causes the sprocket 160 to rotate, the sprocket 160 causes the gear rack 166 to slide on the third track 165. In an example embodiment, to counter balance the weight of the gear rack 166, the gear rack 166 may be coupled to the counter weight 168 through the gear rack frame 170. In some examples, the counter weight 168 may be mounted on the second track 164 such that the counter weight 168 may slide on the second track 164. In some examples, as the gear rack 166 slides along the third track 165, the counter weight 168 also slides along the second track 164. In some examples, the counter weight 168 may not be mounted on the second track 164 and the gear rack 166 may not be mounted on the third track 165. In an alternative embodiment, the counter weight 168 may be mounted on the third track 165 and the gear rack 166 may be mounted on the second track 164.

In an example embodiment, the end manipulator 110 is fixedly coupled to the gear rack assembly 126. In some examples, the end manipulator 110 is coupled to the gear rack 166. The structure of the end manipulator 110 is described in further detail in conjunction with FIG. 3 and FIG. 4.

Figure 3:
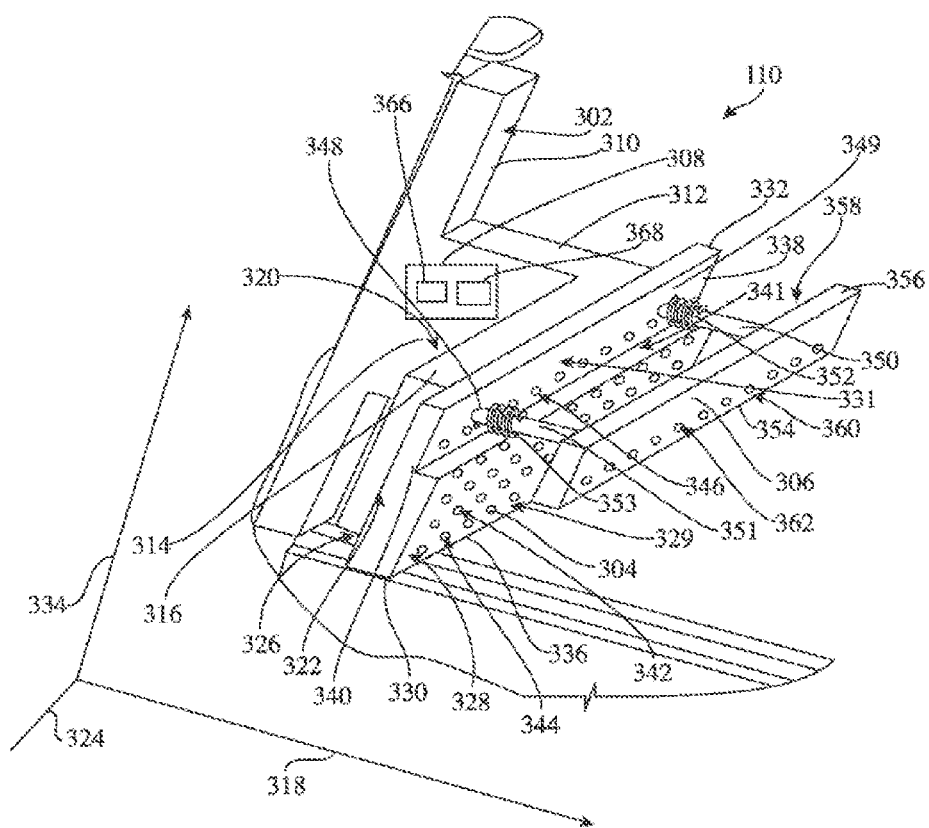
FIG. 3 illustrates a perspective view of an end manipulator of the machine, in accordance with one or more embodiments.

FIG. 3 illustrates a perspective view of the end manipulator 110, in accordance with one or more embodiments. In an example embodiment, the end manipulator 110 includes a second base plate 302, a vacuum plate 304, a grasper plate 306, and a third actuation unit 308. In an example embodiment, the second base plate 302 includes a base portion 310 and a L-shaped portion 312. The base portion 310 of the second base plate 302 may be configured to be coupled to the gear rack 166. In some examples, the L-shaped portion 312 is coupled to the base portion 310 of the second base plate 302. In an example embodiment, the L-shaped portion 312 includes a first arm 314 and a second arm 316. The first arm 314 may be coupled to the base portion 310 such that the first arm 314 extends out from the base portion 310 along a second axis 318. In some examples, when the end manipulator 110 is coupled to the machine 100, the second axis 318 is parallel to the first axis 128. In an example embodiment, the second arm 316 is coupled to the first arm 314 such that the second arm 316 extends out from the first arm 314 and is orthogonal to the first arm 314. Further, the second arm 316 may extend along a third axis 324. In some examples, when the end manipulator 110 couples with the machine 100, the third axis 324 is parallel to the longitudinal axis 136 of the first base plate 120.

In some examples, the second arm 316 has a first surface 320 and a second surface 322. The first surface 320 of the second arm 316 is proximal to the base portion 310 and the second surface 322 of the second arm 316 is distal from the base portion 310. In an example embodiment, the vacuum plate 304 is disposed on the second surface 322 of the second arm 316. In an example embodiment, the vacuum plate 304 defines a first surface 326, a second surface 328, a first end 330, and a second end 332. The first end 330 of the vacuum plate 304 and the second end 332 of the vacuum plate 304 may be positioned along a fourth axis 334. In an example embodiment, the fourth axis 334 is orthogonal to the second axis 318 and the third axis 324. The first surface 326 of the vacuum plate 304 abuts the second surface 322 of the second arm 316. The second surface 328 of the vacuum plate 304 defines a first portion 336 of the vacuum plate 304 and a second portion 338 of the vacuum plate 304. The first portion 336 of the vacuum plate 304 may extend from the first end 330 of the vacuum plate 304 to a junction 340 between the first portion 336 of the vacuum plate 304 and the second portion 338 of the vacuum plate 304. Further, the second portion 338 of the vacuum plate 304 may extend between the second end 332 of the vacuum plate 304 and the junction 340 between the first portion 336 of the vacuum plate 304 and the second portion 338 of the vacuum plate 304. In some examples, a width of the first portion 336 of the vacuum plate 304 is greater than the width of the second portion 338 of the vacuum plate 304 such that a step 341 is defined at the junction 340 between the first portion 336 of the vacuum plate 304 and the second portion 338 to the second end 332 of the vacuum plate 304. Hereinafter, the second surface 328 of the vacuum plate 304 within the first portion 336 of the vacuum plate 304 is referred to as a third surface 329. Further, hereinafter, the second surface 328 of the vacuum plate 304 within the second portion 338 of the vacuum plate 304 is referred to as a fourth surface 331.

In an example embodiment, the first portion 336 of the vacuum plate 304 includes a first set of vacuum cups 342. The first set of vacuum cups 342 are positioned on the third surface 329 of the vacuum plate 304. Further, the first set of vacuum cups 342 are coupled to a first set of vacuum conduits 344 that extends from the third surface 329 of the vacuum plate 304 to the first surface 326 of the vacuum plate 304. In some examples, the first set of vacuum conduits 344 may further extend through the second arm 316. In an example embodiment, the fourth surface 331 of the vacuum plate 304 defines a second set of vacuum conduits 346 that may extend to the first surface 326 of the vacuum plate 304. Similar to the first set of vacuum conduits 344, the second set of the vacuum conduits 346 may also extend through the second arm 316.

Additionally, the fourth surface 331 of the vacuum plate 304 further defines a second through-hole 348 and a third through-hole 349 in the second portion 338 of the vacuum plate 304. The second through-hole 348 and third through-hole 349 may extend from the fourth surface 331 of the vacuum plate 304 to the first surface 326 of the vacuum plate 304. In an example embodiment, the second through-hole 348 and third through-hole 349 are configured to receive a first extendible arm 350 and a second extendible arm 351, respectively. In some examples, the first extendible arm 350 and the second extendible arm 351 may correspond to arms having variable length. Some examples of the first extendible arm 350 and the second extendible arm 351 may include telescopic arms. In an example embodiment, the first extendible arm 350 and the second extendible arm 351 may be configured to be in an extended state and in a retracted state based on the length of the first extendible arm 350 and the second extendible arm 351. For example, the first extendible arm 350 and the second extendible arm 351 are said to be in the extended state when the first extendible arm 350 and the second extendible arm 351 have a maximum possible length. In the extended state, the first extendible arm 350 and the second extendible arm 351 extend out from the vacuum plate 304. In some examples, in the extended state, the first extendible arm 350 and the second extendible arm 351 extend out from the second portion 338 of the vacuum plate 304.

In another example, the first extendible arm 350 and the second extendible arm 351 are said to be in the retracted state when the first extendible arm 350 and the second extendible arm 351 have a minimum possible length. In an example embodiment, the first extendible arm 350 and the second extendible arm 351 may be coupled to the second arm 316 through a biasing member such as, but not limited to, a first spring 352 and a second spring 353. In some examples, the first spring 352 and the second spring 353 may be configured to keep the first extendible arm 350 and the second extendible arm 351 in the extended position. In alternative embodiment, the first spring 352 and the second spring 353 may be configured to keep the first extendible arm 350 and the second extendible arm 351 in the retracted position.

In an example embodiment, the grasper plate 306 may be coupled to the first extendible arm 350 and the second extendible arm 351. In an example embodiment, the grasper plate 306 has a first end 354, a second end 356, a first surface 358, a second surface 360, and a second set of vacuum cups 362. In an example embodiment, the first end 354 of the grasper plate 306 and the second end 356 of the grasper plate 306 may be defined along the fourth axis 334. Further, the first surface 358 of the grasper plate 306 is proximal to the fourth surface 331 of the vacuum plate 304 and the second surface 360 of the grasper plate 306 is distal from the fourth surface 331 of the vacuum plate 304. Further, the second set of vacuum cups 362 may be positioned on the second surface 360 of the grasper plate 306.

Since the grasper plate 306 is coupled to the first extendible arm 350 and the second extendible arm 351 and the length of the first extendible arm 350 and the second extendible arm 351 is variable, therefore, the position of the grasper plate 306 may vary in accordance with the variation in the length of the first extendible arm 350 and the second extendible arm 351. For example, the grasper plate 306 may also traverse/move between a retracted position and an extended position. The configuration of the end manipulator 110 when the grasper plate 306 is in the retracted position is further illustrated in FIG. 4.

Figure 4:
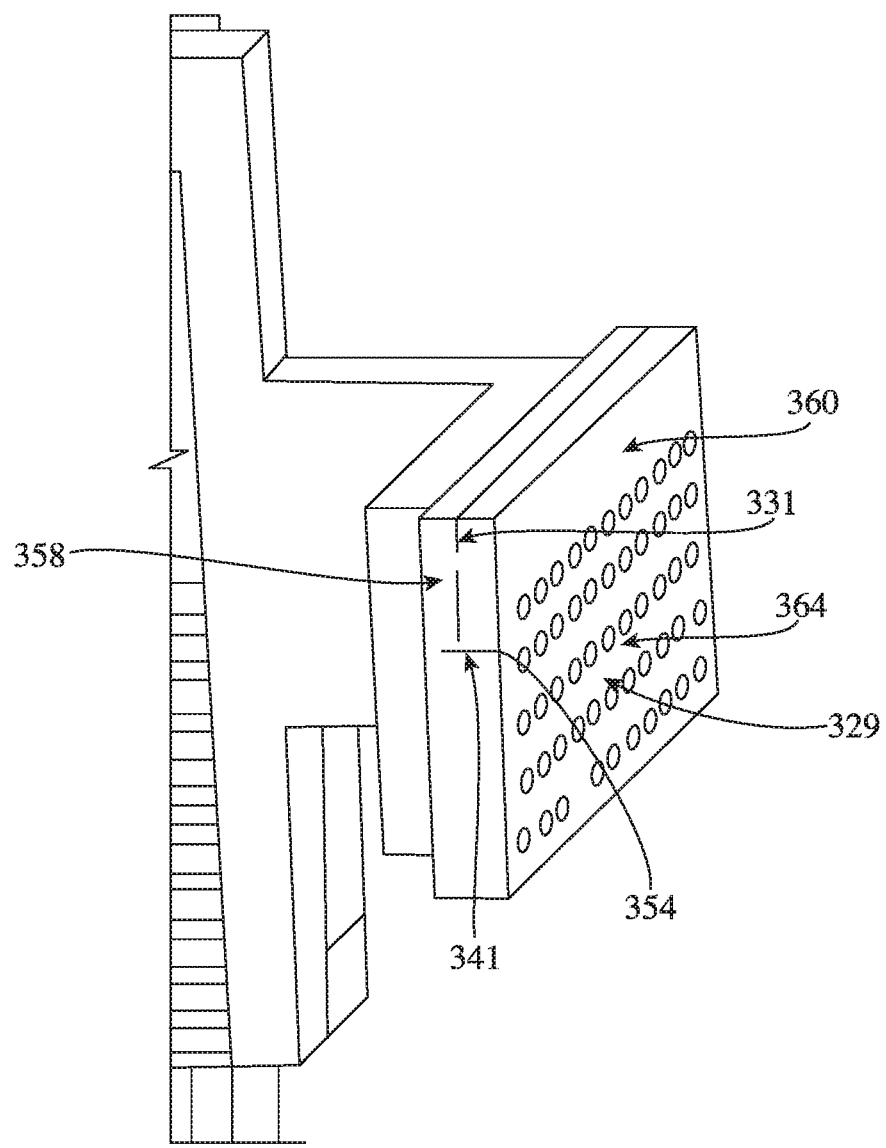
FIG. 4 illustrates another perspective view of the end manipulator of the machine, in accordance with one or more embodiments.

FIG. 4 illustrates another perspective view of the end manipulator 110, in accordance with one or more embodiments. Referring to FIG. 4, in the retracted position, the first end 354 of the grasper plate 306 may abut the step 341 defined on the vacuum plate 304. Further, in the retracted position, the first surface 358 of the grasper plate 306 may abut the fourth surface 331 of the vacuum plate 304. Furthermore, in the retracted position, the third surface 329 of the vacuum plate 304 and the second surface 360 of the grasper plate 306 may be in the same plane such that the second surface 360 of the grasper plate 306 and the third surface 329 of the vacuum plate 304 define a contiguous surface 364 of the end manipulator 110. Additionally, in the retracted position, the second set of vacuum cups 362 may be communicatively coupled with the second set of vacuum conduits 346. As described, in one embodiment, the first spring 352 and the second spring 353 are configured to keep the first extendible arm 350 and the second extendible arm 351 in the retracted position, accordingly, the first spring 352 and the second spring 353 keep the grasper plate 306 in the retracted position.

Referring back to FIG. 3, in the extended position, the grasper plate 306 extends out from the vacuum plate 304 and the second set of vacuum cups 362 decouples from the second set of vacuum conduits 346.

In an example embodiment, the first set of vacuum conduits 344 and the second set of vacuum conduits 346 may be coupled with the third actuation unit 308. In some examples, the third actuation unit 308 may be positioned on the first surface 320 of the second arm 316. In some examples, the scope of the disclosure is not limited to the third actuation unit 308 positioned on the second arm 316. In an alternative embodiment, the third actuation unit 308 may be positioned on the first arm 314 or on the machine 100.

In an example embodiment, the third actuation unit 308 includes a third motor 366 and a vacuum generator 368. In some examples, the third motor 366 may be coupled to the vacuum generator 368 and the vacuum generator 368 may be coupled to the first set of vacuum cups 342 and the second set of vacuum cups 362 through the first set of vacuum conduits 344 and the second set of vacuum conduits 346, respectively. In an example embodiment, the third motor 366 may be configured to operate the vacuum generator 368, which in turn generates vacuum (negative set of vacuum cups 362). Further, the third motor 366 is coupled with the first extendible arm 350 and the second extendible arm 351. In an example embodiment, the third motor 366 is configured to apply an external force on the first extendible arm 350 and the second extendible arm 351. Accordingly, the length of the first extendible arm 350 and the second extendible arm 351 varies. As the length of the first extendible arm 350 and the second extendible arm 351 varies, the position of the grasper plate 306 varies. Therefore, on the application of the external force from the third motor 366, the grasper plate 306 moves between the extended position and the retracted position.

Referring back to FIG. 1, the control system 112 is configured to control the operation of the machine 100. More particularly, the control system 112 may be configured to control the operation of the first actuation unit 102, the second actuation unit 104, and the third actuation unit 308, as is further described in conjunction with FIG. 5 and FIG. 6.

Figure 5:
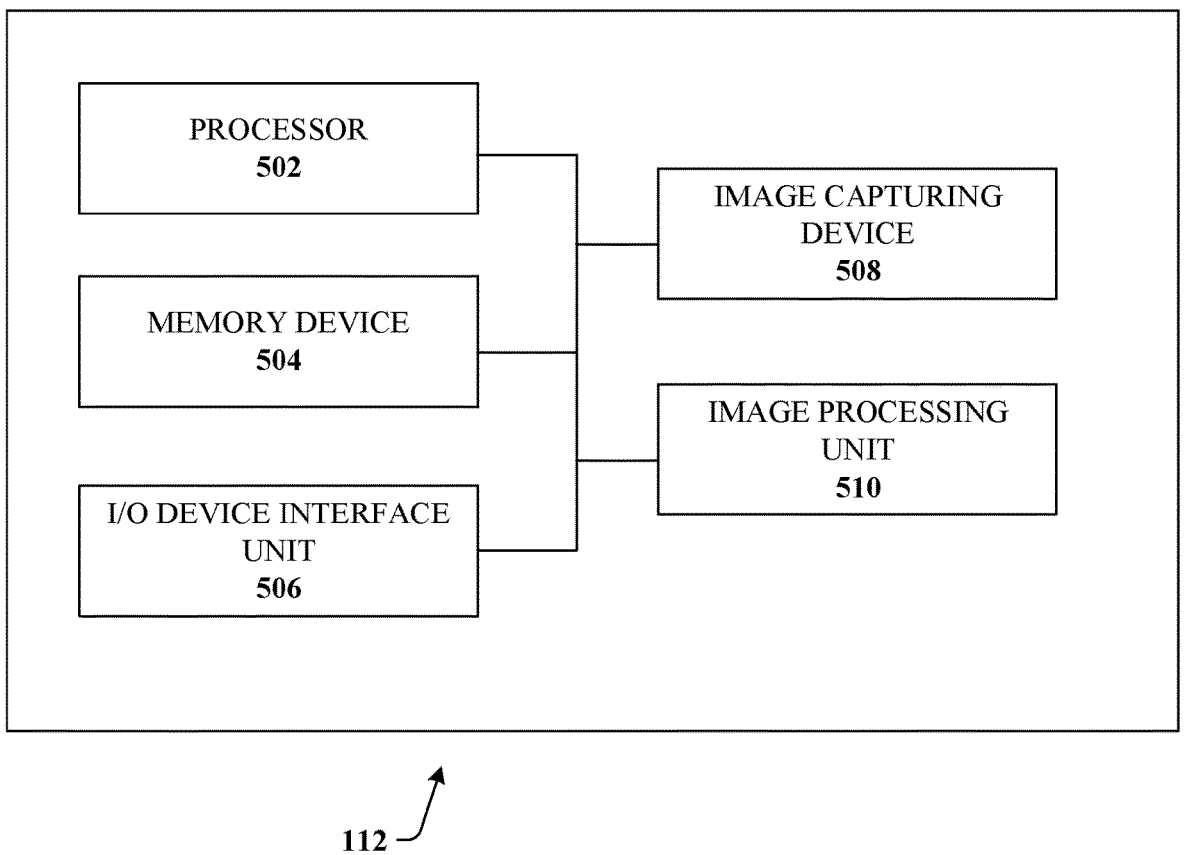
FIG. 5 illustrates a block diagram of the control system, in accordance with one or more embodiments.

FIG. 5 illustrates a block diagram of the control system 112, in accordance with one or more embodiments. The control system 112 includes a processor 502, a memory device 504, an input/output (I/O) device interface unit 506, image capturing device 508, and an image processing unit 510. In an example embodiment, the processor 502 is communicatively coupled to the memory device 504, the I/O device interface unit 506, the image processing unit 510, and an image capturing device 508.

The processor 502 may be embodied as a means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 5 as a single processor, in an embodiment, the processor 502 may include a plurality of processors and signal processing modules. The plurality of processors may be embodied on a single electronic device or may be distributed across a plurality of electronic devices collectively configured to function as the circuitry of the machine 100. The plurality of processors may be in operative communication with each other and may be collectively configured to perform one or more functionalities of the circuitry of the machine 100, as described herein. In an example embodiment, the processor 502 may be configured to execute instructions stored in the memory device 504 or otherwise accessible to the processor 502. These instructions, when executed by the processor 502, may cause the circuitry of the machine 100 to perform one or more of the functionalities, as described herein.

Whether configured by hardware, firmware/software methods, or by a combination thereof, the processor 502 may include an entity capable of performing operations according to embodiments of the present disclosure while configured accordingly. Thus, for example, when the processor 502 is embodied as an ASIC, FPGA, or the like, the processor 502 may include specifically configured hardware for conducting one or more operations described herein. Alternatively, as another example, when the processor 502 is embodied as an executor of instructions, such as may be stored in the memory device 504, the instructions may specifically configure the processor 502 to perform one or more algorithms and operations described herein.

Thus, the processor 502 used herein may refer to a programmable microprocessor, microcomputer or multiple processor chip or chips that may be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory may also be located internal to another computing resource (e.g., enabling computer readable instructions to be downloaded over the Internet or another wired or wireless connection).

The memory device 504 may include suitable logic, circuitry, and/or interfaces that are adapted to store a set of instructions that is executable by the processor 502 to perform operations. Some of the memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the memory device 504 may be integrated with the processor 502 on a single chip, without departing from the scope of the disclosure. In an example embodiment, the memory device 504 is configured to store a first set of pre-stored features and a second set of pre-stored features. In some examples, the first set of pre-stored features corresponds to unique features of a first type of package. Further, the second set of pre-stored features corresponds to unique features of a second type of package. In an example embodiment, the first set of pre-stored features and the second set of pre-stored features may correspond to Scale Invariant Feature Transform (SIFT) descriptors that are used to uniquely identify an object (e.g., the first type of package or the second type of package).

The I/O device interface unit 506 may include suitable logic, circuitry, and/or interfaces that are adapted to transmit and received information from one or more components of the machine 100 and the control system 112. For example, the I/O device interface unit 506 may be configured to send/receive messages to/from, the image capturing device 508, the first actuation unit 102, the second actuation unit 104, and the third actuation unit 308. In an example embodiment, the I/O device interface unit 506 may be configured to communicate with the one or more components, in accordance with one or more device communication protocols such as, but not limited to, I2C communication protocol, Serial Peripheral Interface (SPI) communication protocol, serial communication protocol, Control Area Network (CAN) communication protocol, and 1-Wire® communication protocol. Some examples of the input/output interface unit 306 may include, but not limited to, a Data Acquisition (DAQ) card, an electrical drives driver circuit, and/or the like.

The image capturing device 508 may correspond to an electronic device that is capable of generating an image based on light signals received from a corresponding field of view of the image capturing device 508. In some examples, the image capturing device 508 may be configured to generate an image based on reception of light signals in the visible light spectrum. The light signal received by the image capturing device 508 may correspond to a light generated by an illumination source on the image capturing device 508, may be ambient light, or may be from an external source. In an example embodiment, the image capturing device 508 may include a depth sensor (not shown) that is configured to capture depth information of the field of view. Some example depth sensors include, but are not limited to, structured light base depth sensor, (Infra-Red) IR based depth sensor, time of flight based depth sensor, and/or the like.

In an example embodiment, the image capturing device 508 may further include a lens assembly (not shown) and a sensor assembly (not shown). The lens assembly may include one or more optical components, such as one or more lenses, diffusers, wedges, reflectors or any combination thereof, for directing the light signal on the sensor assembly. In an example embodiment, the sensor assembly includes an image sensor, such as a color or monochrome 1D or 3D CCD, CMOS, NMOS, PMOS, CID or CMD solid state image sensor, that may be configured to generate the image based on the received light signal.

The image processing unit 510 may include suitable logic and/or circuitry that may enable the image processing unit 510 to process an image captured by the image capturing device 508. For example, the image processing unit 510 may be configured to identify a type of package (i.e., the first type of package or the second type of package) in the captured image, as is further described in FIG. 6. In some embodiments, the image processing unit 510 may include a separate processor, specially configured Field Programmable Gate Array (FPGA), or Application Specific Integrated Circuit (ASIC).

Figure 6:
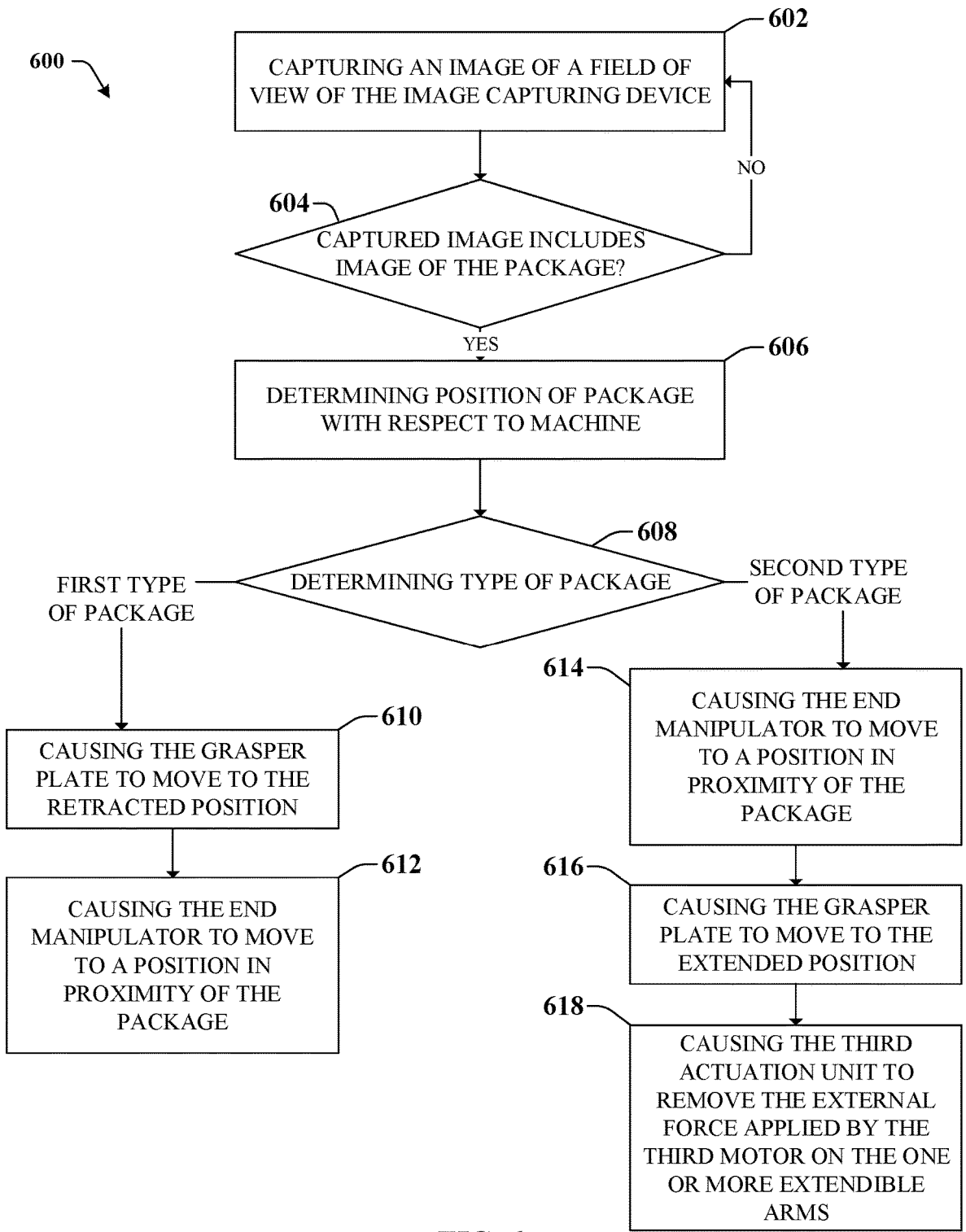
FIG. 6 illustrates a flowchart describing a method for operating the machine, in accordance with the one or more embodiments.
Figure 9:
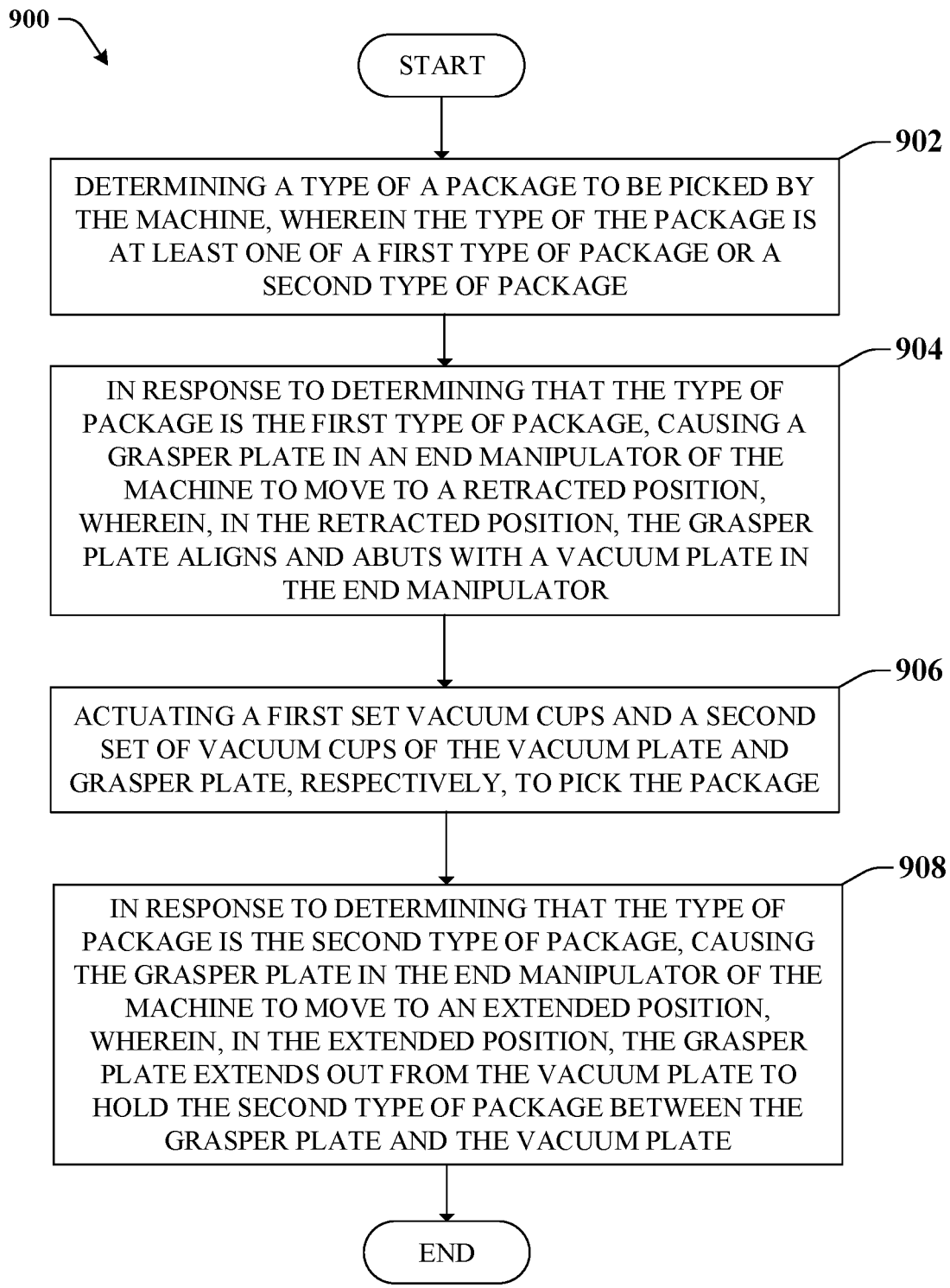
FIG. 9 illustrates another flowchart describing a method for operating the machine, in accordance with the one or more embodiments.

The operation of the control system 112 is further described in conjunction with FIGS. 6 and 9.

FIGS. 6 and 9 illustrate example flowcharts of the operations performed by an apparatus, such as the control system 112 of FIGS. 1, 2, and 3, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations FIGS. 6 and 9, when executed, convert a computer or processing circuitry into a particular machine configured to perform an example embodiment of the present invention. Accordingly, the operations of FIGS. 6 and 9 define algorithms for configuring one or more computers or processors to perform various example embodiments. In some cases, a general purpose computer may be provided with an instance of the processor which performs the algorithms of FIGS. 6 and 9 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, may be implemented by special purpose hardware-based computer systems which perform the specified functions, or combinations of special purpose hardware and computer instructions.

FIG. 6 illustrates a flowchart 600 describing a method for operating the machine 100, in accordance with the one or more embodiments. The flowchart 600 has been described in conjunction with FIGS. 1-5.

At step 602, the control system 112 includes means such as the processor 502, the I/O device interface unit 506, the image processing unit 510, the image capturing device 508 and/or the like, for capturing an image of the field of view of the image capturing device 508. In an example embodiment, the processor 502 may be configured to cause the I/O device interface unit 506 to send an instruction to the image capturing device 508 to capture the image. On receiving the instruction, the image capturing device 508 may be configured to capture the image of the field of view. Further, the image capturing device 508 may be configured to capture the depth information of the field of view of the image capturing device 508. Upon capturing the image and the depth information, the image capturing device 508 may be configured to transmit the captured image and the depth information to the processor 502.

At step 604, the control system 112 includes means such as the processor 502, the image processing unit 510, and/or the like, for determining whether the captured image includes an image of a package to be picked and placed. In an example embodiment, the image processing unit 510 may be configured to utilize one or more object identification techniques such as, but not limited to, Hough transform, Gabor filtering, Convolution Neural Network (CNN), scale invariant feature transform (SIFT), speeded up robust features (SURF), and/or the like to determine whether the captured image includes the image of the package. For example, the image processing unit 510 may be configured to determine one or more unique features in the captured image by utilizing the SIFT technique. Thereafter, the image processing unit 510 may be configured to compare the one or more determined unique features with the first set of pre-stored features (corresponding to the first type of package) and the second set of pre-stored features (corresponding to the second type of package). If the image processing unit 510 determines that the one or more determined unique features include a set of unique features that matches the first set of pre-stored features or the second set of pre-stored features, the image processing unit 510 determines that the captured image includes the image of the package. Accordingly, the processor 502 may be configured to perform the step 606. However, if the image processing unit 510 determines that the captured image does not include the image of the package, the processor 502 may be configured to repeat the step 602.

At step 606, the control system 112 includes means such as the processor 502, the image processing unit 510, and/or the like, for determining the position of the package with respect to the machine 100. In an example embodiment, the processor 502 may utilize the depth information captured by the image capturing device 508 to determine the position of the package with respect to the machine 100. For example, the image processing unit 510 may be configured to determine a displacement measure of the package from the end manipulator 110 based on the depth information. Thereafter, the image processing unit 510 may be configured to consider a current position of the end manipulator 110 as the origin of a coordinate system (e.g., Cartesian coordinate system). Based on the current position of the end manipulator 110 and the determined displacement measure, the image processing unit 510 is configured to determine the position of the package with respect to the end manipulator 110. In an example embodiment, the position of the package may correspond to coordinates of the package (x coordinate, y coordinate, and z coordinate) in the coordinate system. In some examples, the processor 502 may utilize one or more coordinate systems (e.g., Cartesian coordinate systems, Polar coordinate systems, and/or the like) to determine the position of the package with respect to the end manipulator 110.

Thereafter, the processor 502 may be configured to determine a first distance along the first axis 128 and a second distance along the longitudinal axis 134 of the vertical support member 108 that the end manipulator 110 has to traverse to pick the package. In an example embodiment, the processor 502 may determine the first distance and the second distance based on the determined position of the package and the current position of the end manipulator 110.

At step 608, the control system 112 includes means such as the processor 502, the image processing unit 510, and/or the like, for determining a type of the package (e.g., the first type of the package or the second type of the package) within the field of view of the image capturing device 508. As discussed in the step 604, the image processing unit 510 is configured to compare the one or more determined unique features with the first set of pre-stored features and the second set of pre-stored features to determine whether the image of the package is present in the captured image. If at step 604, the image processing unit 510 determines that the one or more determined unique features include the set of unique features that correspond or matches to the first set of pre-stored features, the image processing unit 510 determines that the package in the field of view of the image capturing device 508 is the first type of package. Accordingly, the processor 502 may be configured to perform the step 610. On the other hand, if the image processing unit 510 determines that the set of unique features corresponds or matches to the second set of pre-stored features, the image processing unit 510 determines that the package in the field of view of the image capturing device 508 is the second type of package. Accordingly, the processor 502 performs the step 614.

At step 610, the control system 112 includes means such as the processor 502, the I/O device interface unit 506, and/or the like, for causing the grasper plate 306 to move to the retracted position. To move the grasper plate 306 to the retracted position, the I/O device interface unit 506 may cause the third actuation unit 308 (i.e., the third motor 366) to remove the external force applied on the first extendible arm 350 and the second extendible arm 351. As the external force from the first extendible arm 350 and the second extendible arm 351 is removed, the first extendible arm 350 and the second extendible arm 351 move to the retracted state (based on the force applied by the first spring 352 and the second spring 353). Accordingly, the grasper plate 306 moves to the retracted position.

Further, the I/O device interface unit 506 is configured to cause the third actuation unit 308 to generate vacuum in the first set of vacuum cups 342 and the second set of vacuum cups 362. In an example embodiment, the third actuation unit 308 may be configured to utilize the vacuum generator 368 to generate the vacuum in the first set of vacuum cups 342 and the second set of vacuum cups 362.

At step 612, the control system 112 includes means such as the processor 502, the I/O device interface unit 506, and/or the like, for causing the end manipulator 110 to move to a position in proximity of the package. To move the end manipulator 110 in proximity of the package, in an example embodiment, the I/O device interface unit 506 may transmit an instruction to the first actuation unit 102 to cause movement of the machine 100 by the first distance along the first axis 128. Upon receiving the instruction, the first actuation unit 102 may cause the first motor 116 to drive the one or more traction members 114 on the one or more first tracks 118. Accordingly, the machine 100 moves along the first axis 128. Since end manipulator 110 is coupled to the machine 100, therefore, with movement of the machine 100, the end manipulator 110 also moves along the first axis 128 by the first distance. Subsequently, in some examples, the I/O device interface unit 506 may transmit another instruction to the second actuation unit 104 to move the end manipulator 110 by the second distance (determined in the step 606) along the longitudinal axis 134 of the vertical support member 108. Upon receiving the other instruction, the second actuation unit 104 may cause the second motor 124 to rotate the sprocket 160. Rotation of the sprocket 160 causes the gear rack assembly 126 to move along the longitudinal axis 134 of the vertical support member 108. Accordingly, the end manipulator 110 moves along the longitudinal axis 134 of the vertical support member 108. In an example embodiment, by moving the end manipulator 110 by the first distance along the first axis 128 and by the second distance along the longitudinal axis 134, the end manipulator 110 is positioned in proximity or in contact with the package. In some examples, the I/O device interface unit 506 may be configured to cause both the first actuation unit 102 and the second actuation unit 104 to operate simultaneously in order to move the end manipulator 110 in proximity to the package.

Thereafter, the package is attached to the end manipulator 110 through the first set of vacuum cups 342 and the second set of vacuum cups 362 (since processor 502 has caused the vacuum generator 368 to generate vacuum in the first set of vacuum cups 342 and the second set of vacuum cups 362 in the step 608).

At step 614 the control system 112 includes means such as the processor 502, I/O device interface unit 506, and/or the like, for causing the first actuation unit 102 and the second actuation unit 104 to move the end manipulator 110 to the position in proximity to the package (based on the first distance and the second distance determined in the step 606). In an example embodiment, the processor 502 may be configured to utilize similar methodology as described in the step 610 to cause the movement of the end manipulator 110 to the position in proximity to the package.

At step 616, the control system 112 includes means such as the processor 502, the I/O device interface unit 506, and/or the like, for causing the grasper plate 306 to move to the extended position. In an example embodiment, the I/O device interface unit 506 may be configured to the transmit an instruction to the third actuation unit 308 to cause the grasper plate 306 to move to the extended position. Upon receiving the instruction, the third actuation unit 308 may be configured to activate the third motor 366, which applies the external force on the first extendible arm 350 and the second extendible arm 351 to move to the extended state. Accordingly, the grasper plate 306 moves to the extended position. Further, I/O device interface unit 506 may be configured to transmit another instruction to the third actuation unit 308 to disable the vacuum generator 368.

In the extended position, the grasper plate 306 engages with the one or more features defined on the surface of the package (since the package is determined to be the second type of package in step 608).

At step 618, the control system 112 includes means such as the processor 502, the I/O device interface unit 506, and/or the like, for causing the third actuation unit 308 to remove the external force applied by the third motor 366 on the first extendible arm 350 and the second extendible arm 351. Upon removing the external force, the first extendible arm 350 and the second extendible arm 351 may attempt to move to the retracted state (based on the force applied by the first spring 352 and the second spring 353). Since the grasper plate 306 is engaged with the one or more features on the surface of the package, therefore, the grasper plate 306 is unable to move to the retracted position. Instead the grasper plate 306 moves to an intermediate position defined by the width of the feature of the package or the width of the package. In an example embodiment, in the intermediate position, the package is pinched between the grasper plate 306 and the vacuum plate 304 and is therefore engaged with the end manipulator 110.

In some examples, the scope of the disclosure is not limited to the deactivating the vacuum generator 368 when the package of the second type of package is to be picked. In an example embodiment, the processor 502 may be configured to cause the vacuum generator 368 to generate vacuum in the first set of vacuum cups 342. Accordingly, the first set of vacuum cups 342 engages with the surface of the package of the second type of package in addition to the package being pinched between the grasper plate 306 and the vacuum plate 304.

Figure 7:
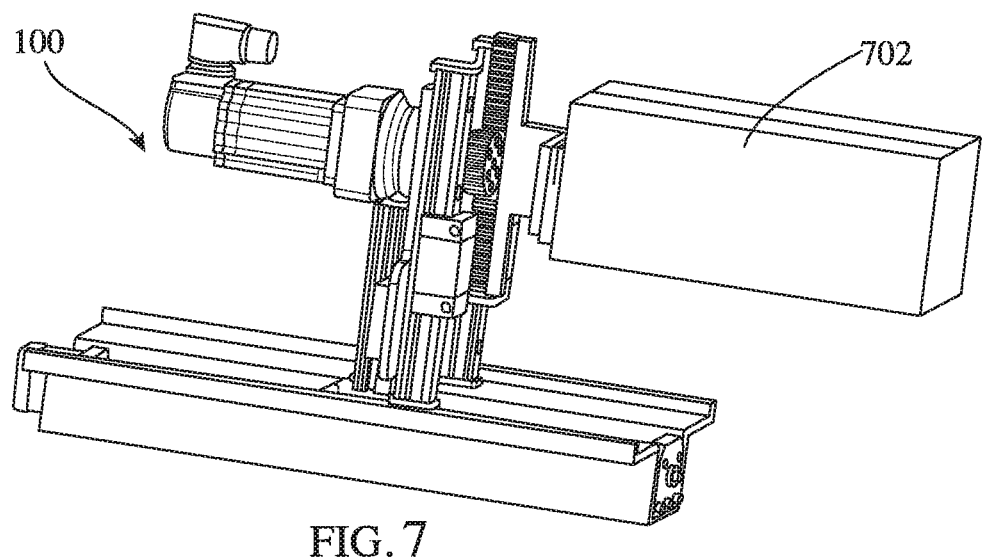
FIG. 7 illustrates a perspective view of the machine having picked a first type of package, in accordance with the one or more embodiments.

FIG. 7 illustrates a perspective view of the machine 100 having picked a first package 702 of the first type of package, in accordance with the one or more embodiments. From FIG. 7, it may be observed that the grasper plate 306 is in the retracted position. Further, it may be observed that the first set of vacuum cups 342 and the second set of vacuum cups 362 are engaged with the surface of the first package 702.

Figure 8:
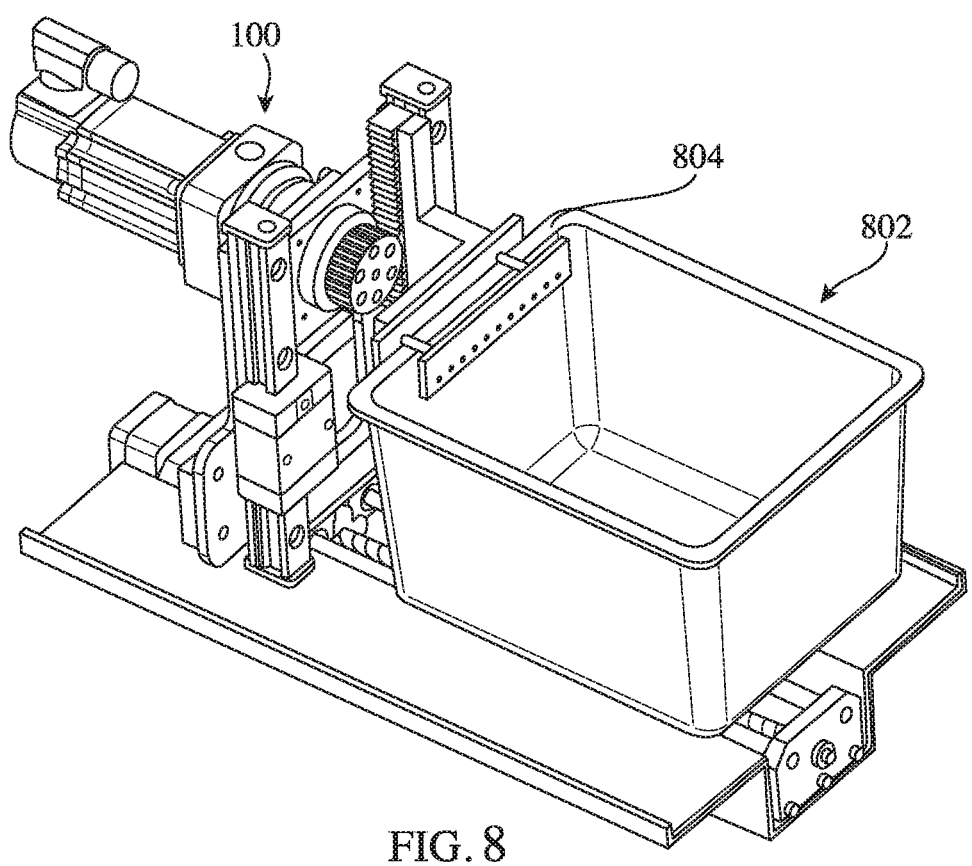
FIG. 8 illustrates a perspective view of the machine having picked a second type of package, in accordance with the one or more embodiments.

FIG. 8 illustrates a perspective view of the machine 100 having picked a second package 802 of the second type of package, in accordance with the one or more embodiments. The second package 802 has a feature 804. From FIG. 8, it may be observed that the grasper plate 306 is in the extended position and is engaged with the feature 804 on the surface of the second package 802. Further, it may be observed from FIG. 8 that the second package 802 is pinched between the grasper plate 306 and the vacuum plate 304.

FIG. 9 illustrates a flowchart 900 of a method for operating the machine 100, in accordance with one or more embodiments.

At step 902, the method includes determining a type of the package to be picked by the machine 100, wherein the type of the package is at least one of a first type of package or a second type of package. Thereafter, at step 904, in response to determining that the type of package is the first type of package, the method includes causing the grasper plate 306 in the end manipulator 110 of the machine 100 to move to a retracted position, wherein, in the retracted position, the grasper plate 306 aligns and abuts with the vacuum plate 304 in the end manipulator 110. Subsequently, at step 906, the method includes actuating the first set of vacuum cups 342 and the second set of vacuum cups 362 of the vacuum plate 304 and grasper plate 306, respectively, to pick the package. Further, at step 908, in response to determining that the type of package is the second type of package, the method includes causing the grasper plate 306 in the end manipulator 110 of the machine 100 to move to an extended position, wherein, in the extended position, the grasper plate 306 extends out from the vacuum plate 304 to hold the second type of package between the grasper plate and the vacuum plate.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any processor, controller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the machine. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. An end manipulator for a machine, the end manipulator comprising:
 a vacuum plate configured to be coupled to the machine, the vacuum plate comprising a first set of vacuum cups, a first set of vacuum conduits, and a second set of vacuum conduits; and
 a grasper plate configured to be movably coupled to the machine comprising a second set of vacuum cups, wherein the grasper plate is configured to move between a retracted position and an extended position, wherein, in the retracted position, the grasper plate aligns with the vacuum plate such that the grasper plate abuts the vacuum plate to activate the second set of vacuum cups by coupling the second set of vacuum cups with the second set of vacuum conduits to configure the end manipulator to pick and place a first package by enabling the first set of vacuum cups and the second set of vacuum cups of the vacuum plate and the grasper plate, and wherein, in the extended position, the grasper plate extends out from the vacuum plate to deactivate the second set of vacuum cups by decoupling the second set of vacuum cups with the second set of vacuum conduits to configure the end manipulator to pinch and hold a second package between the grasper plate and the vacuum plate to pick and place the second package.

2. The end manipulator of claim 1, wherein the vacuum plate defines a first top surface, wherein the first set of vacuum cups are positioned on the first top surface of the vacuum plate.

3. The end manipulator of claim 2, wherein the grasper plate defines a second top surface, wherein, in the retracted position, the second top surface of the grasper plate aligns with the first top surface of the vacuum plate to define a contiguous top surface of the end manipulator.

4. The end manipulator of claim 1, wherein the first set of vacuum cups and the second set of vacuum cups of the vacuum plate and the grasper plate, respectively, are coupled to a vacuum generator.

5. The end manipulator of claim 4, wherein the end manipulator is configured to pick and place the first package using the first set of vacuum cups and the second set of vacuum cups.

6. The end manipulator of claim 1, wherein the end manipulator is configured to pick and place the second package using the grasper plate, wherein the second package is held between the grasper plate and the vacuum plate.

7. The end manipulator of claim 1, wherein the grasper plate further comprises one or more springs configured to urge the grasper plate to the retracted position.

8. A machine comprising:
one or more belts;
a shelf coupled to the one or more belts, wherein the one or more belts facilitates movement of the shelf along a first axis of the machine;
a base plate coupled to the shelf; and
an end manipulator coupled to the base plate, wherein the base plate facilitates movement of the end manipulator along another axis perpendicular to the first axis, wherein the end manipulator comprises:
a vacuum plate coupled to the base plate, the vacuum plate comprising a first set of vacuum cups, a first set of vacuum conduits, and a second set of vacuum conduits, and
a grasper plate movably coupled to the base plate, wherein the grasper plate comprises a second set of vacuum cups, and is configured to move between a retracted position and an extended position, wherein, in the retracted position, the grasper plate aligns with the vacuum plate such that the grasper plate abuts the vacuum plate to activate the second set of vacuum cups by coupling the second set of vacuum cups with the second set of vacuum conduits to configure the end manipulator to pick and place a first package by enabling the first set of vacuum cups and the second set of vacuum cups of the vacuum plate and the grasper plate, and wherein, in the extended position, the grasper plate extends out from the vacuum plate to deactivate the second set of vacuum cups by decoupling the second set of vacuum cups with the second set of vacuum conduits to configure the end manipulator to pinch and hold a second package between the grasper plate and the vacuum plate to pick and place the second package.

9. The machine of claim 8, further comprising a motor, wherein the motor is coupled to the grasper plate, and wherein the motor facilitates movement of the grasper plate between the extended position and the retracted position.

10. The machine of claim 9, wherein the grasper plate further comprises one or more springs configured to urge the grasper plate to the retracted position.

11. The machine of claim 9, wherein the vacuum plate defines a first top surface, wherein the first set of vacuum cups are positioned on the first top surface of the vacuum plate.

12. The machine of claim 11, wherein the grasper plate defines a second top surface, wherein, in the retracted position, the second top surface of the grasper plate aligns with the first top surface of the vacuum plate to define a contiguous top surface of the end manipulator.

13. The machine of claim 9, wherein second set of vacuum cups are positioned on a first top surface of the grasper plate.

14. The machine of claim 13, wherein the end manipulator is configured to pick and place the first package using the first set of vacuum cups and the second set of vacuum cups.

15. The machine of claim 9, wherein the end manipulator is configured to pick and place the second package using the grasper plate, wherein the second package is held between the grasper plate and the vacuum plate.

16. A method for operating a machine, the method comprising:
determining a type of a package to be picked by the machine, wherein the type of the package is at least one of a first package or a second package;
in response to determining that the type of the package is the first package, causing a grasper plate in an end manipulator of the machine to move to a retracted position, wherein, in the retracted position, the grasper plate aligns and abuts with a vacuum plate in the end manipulator to activate the second set of vacuum cups by coupling the second set of vacuum cups with a second set of vacuum conduits defined on the vacuum plate to configure the end manipulator to pick and place the first package by enabling a first set of vacuum cups and a second set of vacuum cups of the vacuum plate and the grasper plate;
in response to determining that the type of the package is the second package, causing the grasper plate in the end manipulator of the machine to move to an extended position, wherein, in the extended position, the grasper plate extends out from the vacuum plate to deactivate the second set of vacuum cups by decoupling the second set of vacuum cups with the second set of vacuum conduits to configure the end manipulator to pinch and hold the second package between the grasper plate and the vacuum plate to pick and place the second package.

17. The method of claim 16, further comprising capturing an image of the package to determine the type of the package.

18. The method of claim 17, further comprising comparing the image of the package with known images of the first package and the second package to determine the type of the package.

19. The method of claim 16, further comprising applying a force on the grasper plate to cause the grasper plate to move to the extended position.

20. The method of claim 19, further comprising removing the force applied on the grasper plate, wherein upon removal of the force, the grasper plate moves to the retracted position based on another force applied by a spring on the grasper plate.

* * * * *